United States Patent
Bui et al.

(10) Patent No.: US 11,719,313 B2
(45) Date of Patent: *Aug. 8, 2023

(54) ACTUATOR ASSEMBLY FOR ACTUATING AIR BLOCKING ELEMENTS OF AN OUTLET ASSEMBLY

(71) Applicant: JVIS-USA, LLC, Shelby Township, MI (US)

(72) Inventors: Dan M. Bui, Sterling Heights, MI (US); Darius J. Preisler, Macomb, MI (US); Donald Schaefer, Waterford, MI (US); Artem Timoshenko, Macomb, MI (US)

(73) Assignee: JVIS-USA, LLC, Shelby Township, MI (US)

( * ) Notice: Subject to any disclaimer, the term of this patent is extended or adjusted under 35 U.S.C. 154(b) by 377 days.

This patent is subject to a terminal disclaimer.

(21) Appl. No.: 17/021,785

(22) Filed: Sep. 15, 2020

(65) Prior Publication Data

US 2022/0082159 A1    Mar. 17, 2022

(51) Int. Cl.
*F16H 21/44*    (2006.01)
*B60H 1/34*    (2006.01)

(52) U.S. Cl.
CPC ........... *F16H 21/44* (2013.01); *B60H 1/3414* (2013.01); *B60H 2001/3471* (2013.01)

(58) Field of Classification Search
CPC ................. F16H 21/44; B60H 1/3414; B60H 2001/3471
USPC ........................................................ 454/155
See application file for complete search history.

(56) References Cited

U.S. PATENT DOCUMENTS

| 9,963,015 | B1 | 5/2018 | Fraser et al. | |
|---|---|---|---|---|
| 9,989,275 | B2 | 6/2018 | Oe et al. | |
| 2005/0176364 | A1 | 8/2005 | Gehring et al. | |
| 2006/0223430 | A1 | 10/2006 | Shibata et al. | |
| 2014/0302769 | A1* | 10/2014 | Sawada | B60H 1/3421 454/315 |
| 2015/0174989 | A1 | 6/2015 | Oe et al. | |

(Continued)

OTHER PUBLICATIONS

United States Patent Office, Non-Final Office Action for U.S. Appl. No. 17/021,756, dated Sep. 29, 2022.

(Continued)

*Primary Examiner* — Steven B McAllister
*Assistant Examiner* — Charles R Brawner
(74) *Attorney, Agent, or Firm* — Brooks Kushman P.C.

(57) ABSTRACT

An actuator assembly for actuating air blocking elements of an outlet assembly is provided. The actuator assembly includes an actuator arm and a selector member operatively connected to the actuator arm to rotate the actuator arm about an arm axis. The actuator arm is operatively connected to a first air blocking element to rotate the first air blocking element towards its air blocking position without moving a second air blocking element upon rotation of the actuator arm in a first direction from a neutral, non-blocking position of the actuator arm about the arm axis. The actuator arm is operatively connected to the second air blocking element to rotate the second air blocking element towards its air blocking position without moving the first air blocking element upon rotation of the actuator arm in a second direction opposite the first direction from the neutral, non-blocking position.

19 Claims, 10 Drawing Sheets

(56) References Cited

U.S. PATENT DOCUMENTS

| | | |
|---|---|---|
| 2016/0250909 A1 | 9/2016 | Schneider |
| 2017/0176045 A1* | 6/2017 | Terai ..................... B60H 1/345 |
| 2021/0206238 A1* | 7/2021 | Munoz ................ B60H 1/3421 |
| 2021/0260968 A1* | 8/2021 | Kim .................... B60H 1/3414 |

OTHER PUBLICATIONS

United States Patent Office, Notice of Allowance and Fee(s) Due for U.S. Appl. No. 17/021,756, dated Feb. 17, 2023.

* cited by examiner

ACTUATOR ASSEMBLY FOR ACTUATING AIR BLOCKING ELEMENTS OF AN OUTLET ASSEMBLY

CROSS-REFERENCE TO RELATED APPLICATIONS

This application is related to U.S. patent application Ser. No. 17/021,756, entitled "Outlet Assembly Having a Plurality of Operating Modes for Improving Air Flow in an Air Distribution System", filed Sep. 15, 2020 on the same day as this application.

TECHNICAL FIELD

At least one embodiment of the present invention generally relates to actuator assemblies for actuating air blocking elements of outlet assemblies which are typically found in vehicles and residential structures.

OVERVIEW

The basic design of a vehicle vent register is well-known. However, at a high level and with reference to FIG. 1, a vent register, generally indicated at 100, includes a housing 102 and one or more vanes 104. The housing 102 is typically configured and dimensioned for insertion into and attachment to a cooperating aperture (not shown) in a vehicle component such as a dash panel, door trim panel, roof trim panel, center console, etc. The housing 102 is typically positioned at a terminal end of a vehicle HVAC duct (not shown) whereby the duct is in fluid communication with the housing interior such that conditioned air from the HVAC passes through the housing 102 and therefrom into the vehicle passenger cabin (not shown). The vanes 104 are typically pivotally attached to the housing to direct a flow of conditioned air from the vehicle HVAC (not shown) through the vent register 100 and into the passenger cabin. A thumbwheel 103 or other actuator may be included for operating a damper (not shown) which regulates the flow of conditioned air from the HVAC, to enter/exit the vent register 100. A vane actuator 105 may also be included for altering the angle at which conditioned air exits the vent register.

Styling and design considerations often lead to a motor vehicle incorporating air registers in the dashboard to have a high aspect ratio. In other words, those registers are often much wider than they are tall (i.e. the air outlet is "slim"). Such registers have a tendency to produce or discharge a relatively wide air plume.

With a slim outlet register (especially horizontal in placement) it is difficult to achieve airflow aiming targets. The reason for this is because there is not enough room in a housing 60 (FIG. 7) for multiple vanes to turn the air adequately. In some cases, there is only room for one primary vane 70 leaving a blow-by condition. Blow-by condition is referred to a condition where the air is allowed to blow straight by the aiming vanes overpowering the vane aiming direction.

Referring now to FIGS. 2 and 3, there is illustrated a "slim" air register, generally indicated at 10. The air register 10 includes a control tab 12 carried on a vane 14 of a first set of vanes 16 that may be tilted upward or downward in order to allow an operator to adjust the air plume along an angle with respect to the vertical or Z axis of the motor vehicle. As further illustrated in FIG. 3, the control tab 12 is connected by means of a gear set to a vane of a second plurality of vanes 22 which may be angularly adjusted to the left or right in order to direct the air plume along the lateral or Y axis of the motor vehicle.

The typical automobile interior vent or air register may also include other elements that are movable relative to each other, to enable the user to direct the flow of air as the user desires. However, as is known, the air flow inside the conventional housing of the vent may be directed partially against the internal surfaces of the housing. This is undesirable because of the turbulent air flow and inefficiencies that result.

Another prior art vent outlet assembly, generally indicated at 220, is illustrated in FIGS. 4-6. As described in U.S. Pat. No. 9,963,015, the vent outlet assembly 220 includes one or more inlet guides, generally indicated at 234, and one or more outlet guides, generally indicated at 240. The inlet guide 234 includes an at least partially planar body 221 pivotable about an inlet guide axis 248 for directing the inlet part of the air flow toward the outlet guide 240. The outlet guide 240 is pivotable about an outlet guide axis 250.

The inlet guide 234 is pivotable between first and second inlet positions as illustrated in FIGS. 5 and 6, respectively. Also, the outlet guide 240 is pivotable between first and second outlet positions. The inlet and outlet guides 234 and 240, respectively, are each positionable at any position between the first and second inlet positions and between the first and second outlet positions, respectively. In FIG. 4, the inlet and outlet guides 234 and 240, respectively, are each shown in intermediate positions thereof.

The vent outlet assembly 220 includes a housing 222 extending between inlet and outlet ends 224 and 226, respectively. The housing 222 includes lower and upper walls 228 and 230, respectively, which at least partially defining a cavity 232, in which the inlet and outlet guides 234 and 240, respectively, are positioned.

The outlet guide 240 includes one or more outlet barrels 256 mounted inside an outlet sleeve 254. Each of the outlet barrels 256 is pivotable transversely about a transverse axis 280 (FIG. 4).

The pivoting movements of the inlet guide 234 about the inlet guide axis 248 and of the outlet guide 240 about the outlet guide axis 250 are coordinated by a connecting subassembly (not shown) as they pivot about the inlet and outlet guide axes 248 and 250, respectively.

The vent outlet assembly 220 is adapted to direct the air flow out of the housing 222 upwardly, downwardly, or in a range of directions between the furthest upwardly and downwardly directions, which are illustrated in FIGS. 5 and 6, respectively. The movement of the inlet guide 234 and the outlet guide 240 between the first and second inlet positions and the first and second outlet positions, respectively, is controlled by the user via a control subassembly (not shown).

As can be seen in FIG. 4, the inlet guide 234 is positionable at an intermediate position, generally midway between the first and second inlet positions. When the inlet guide 234 is in its intermediate position, the outlet guide 240 preferably is also in its intermediate position, i.e., generally midway between the first and second outlet guide positions, due to the connection of the inlet and outlet guides 234, 240 via the connecting subassembly. As shown in FIG. 4, when the inlet and outlet guides 234, 240 are in their intermediate positions, they are substantially aligned. The air flow entering the inlet end 224 is represented by an arrow "3A", and an inlet part of the air flow past the inlet guide 234 is represented by an arrow "$3B_1$". The inlet part of the air flow is directed toward the outlet guide 240 by the inlet guide 234.

An outlet part of the air flow (being a portion of the inlet part) flows through the outlet guide 240. The outlet part of the air flow flowing through the outlet guide 240 is represented by an arrow "$3C_1$" in FIG. 4, and the air flow exiting the housing 222 via the outlet end 226 is schematically represented by an arrow "3D". The air flow schematically represented by the arrow "3A" is substantially the same as the air flow schematically represented by the arrow "3D", and a proportion of the air flow travels through the cavity 232 outside of the outlet guide 240.

Referring now to FIG. 5, the inlet and outlet guides 234 and 240, respectively, are shown in position to direct the outlet part of the air flow generally upwardly as it exits the outlet end 226 of the housing 222. The inlet guide 234 is shown in the first inlet position, and the outlet sleeve 254 is shown in the first outlet position. The inlet guide 234 and the outlet sleeve 254 are positioned to direct the outlet part of the air flow as far upwardly upon exit as possible, given the positions of the inlet guide 234 and the outlet sleeve 254 inside the cavity 232 in the housing 222. The air flow into the inlet end 224 is again represented by the arrow "3A". The inlet part of the air flow is directed by the inlet guide 234 in the direction indicated by an arrow "$3B_2$". The inlet part of the air flow is directed toward the outlet guide 240. When the inlet and outlet guides 234 and 240, respectively, are positioned as illustrated in FIG. 5, only a portion of the inlet part of the air flow is directed through the outlet guide 240. The outlet part of the air flow is further directed by the outlet sleeve 254 upwardly, by an arrow "$3C_2$". The air flow exiting the housing 222 via the outlet end 226 generally is schematically again represented by the arrow "3D".

Referring now to FIG. 6, the inlet guide 234 and the outlet sleeve 254 are shown positioned to direct the outlet part of the air flow exiting the outlet end 226 of the housing 222 generally downwardly. The inlet guide 234 is shown in the second inlet guide position and the outlet sleeve 254 is shown in the second outlet guide position. The inlet guide 234 and the outlet sleeve 254 are positioned to direct the outlet part of the air flow as far downwardly upon exit as possible, given the positions of the inlet guide 234 and the outlet sleeve 254 inside the cavity 232 in the housing 222. The air flow into the inlet end 224 of the housing 222 is again represented by the arrow "3A". The inlet part of the air flow is directed by the inlet guide 234 in the direction indicated by an arrow "3B3", toward the outlet guide 240. When the inlet and outlet guides 234 and 240, respectively, are positioned as illustrated in FIG. 6, only a portion of the inlet part of the air flow is directed through the outlet guide 240. The outlet part of the air flow is further directed by the outlet sleeve 254 downwardly, as represented by an arrow "3C3". The air flow exiting the housing 222 via the outlet end 226 generally is again schematically represented by the arrow "3D".

Despite the above, there is an ongoing need or desire for a relatively simple and inexpensive mechanism or assembly to actuate air blocking elements of outlet assemblies especially for "slim" air outlets in air distribution systems for vehicles and residential structures.

SUMMARY OF EXAMPLE EMBODIMENTS

An object of at least one embodiment of the present invention is to provide a relatively simple and inexpensive mechanism or assembly to actuate air blocking elements of outlet assemblies, particularly for outlet assemblies found in vehicles and residential structures.

In carrying out the above object and other objects of at least one embodiment of the present invention, an actuator assembly for actuating air blocking elements of an outlet assembly is provided. The actuator assembly includes an actuator arm and a selector member operatively connected to the actuator arm to rotate the actuator arm about an arm axis. The actuator arm is operatively connected to a first air blocking element to rotate the first air blocking element towards its air blocking position without moving a second air blocking element upon rotation of the actuator arm in a first direction from a neutral, non-blocking position of the actuator arm about the arm axis. The actuator arm is operatively connected to the second air blocking element to rotate the second air blocking element towards its air blocking position without moving the first air blocking element upon rotation of the actuator arm in a second direction opposite the first direction from the neutral, non-blocking position.

The actuator arm may include first and second control tracks to receive and retain corresponding pins of links of the first and second air blocking elements, respectively, which ride in the control tracks during rotation of the actuator arm.

Each of the control tracks may be kidney-shaped.

The actuator arm may include a groove to receive and retain a pin of the selector member which rides in the groove during rotation of the actuator arm.

The air blocking elements may comprise upper and lower vanes.

The selector member may comprise a primary vane.

The outlet assembly may be a vehicle outlet assembly.

The outlet assembly may be a residential outlet assembly.

Further in carrying out the above object and other objects of at least one embodiment of the present invention, a manual actuator assembly for actuating air blocking elements of an outlet assembly is provided. The actuator assembly includes an actuator arm and a manually operable selector member operatively connected to the actuator arm to rotate the actuator arm about an arm axis. The actuator arm is operatively connected to a first air blocking element to rotate the first air blocking element towards its air blocking position without moving a second air blocking element upon rotation of the actuator arm in a first direction from a neutral, non-blocking position of the actuator arm about the arm axis. The actuator arm is operatively connected to the second air blocking element to rotate the second air blocking element towards its air blocking position without moving the first air blocking element upon rotation of the actuator arm in a second direction opposite the first direction from the neutral, non-blocking position.

The actuator arm may include first and second control tracks to receive and retain corresponding pins of links of the first and second blocking elements, respectively, which ride in the control tracks during rotation of the actuator arm.

Each of the control tracks may be kidney-shaped.

The actuator arm may include a groove to receive and retain a pin of the selector member which rides in the groove during rotation of the actuator arm.

The air blocking elements may comprise upper and lower vanes.

The selector member may comprise a primary vane.

The outlet assembly may be a vehicle outlet assembly.

The outlet assembly may be a residential outlet assembly.

BRIEF DESCRIPTION OF THE DRAWINGS

FIG. 2) and a Y or lateral axis, respectively, of a motor vehicle;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
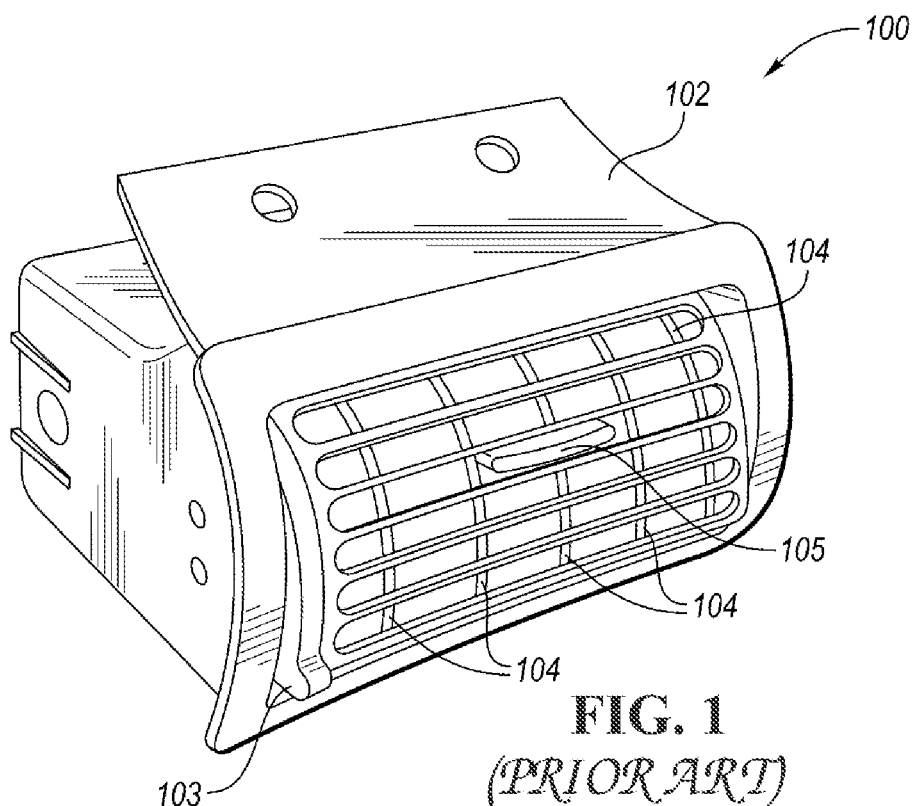
FIG. 1 is a schematic, perspective view of a prior art vehicle vent register.
Figure 2:
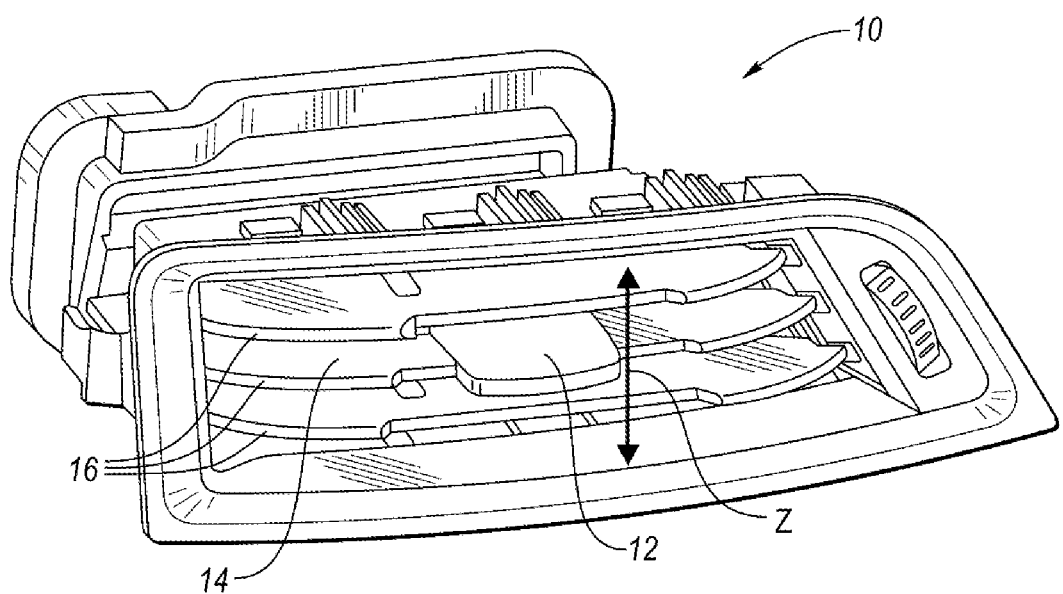
FIG. 2 is a schematic, perspective view of another prior art vehicle air register for controlling an air plume expelled by the air register.
Figure 3:
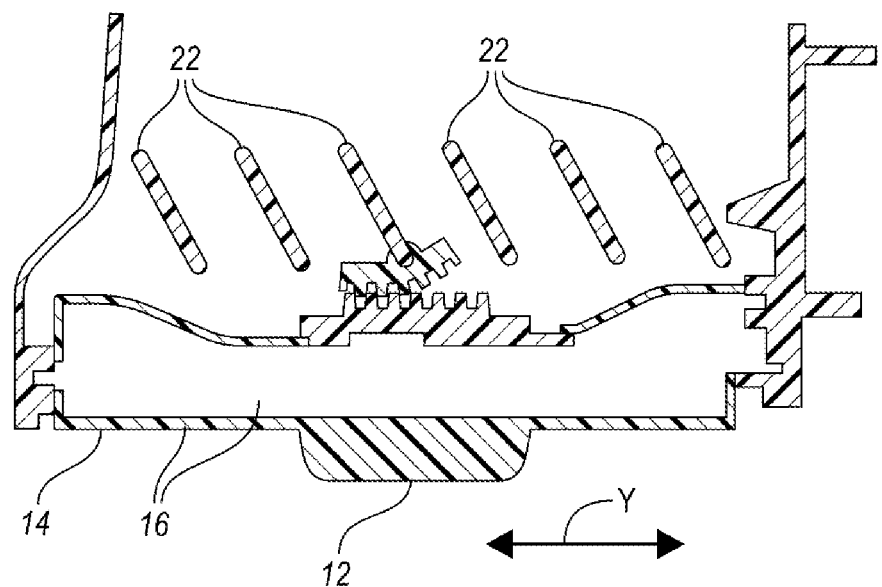
FIG. 3 is a top plan, schematic view, partially broken away, of the air register of FIG. 2, wherein a control tab operates and controls the positioning of first and second sets of vanes to direct the air plume along a Z or vertical axis (i.e.
Figure 4:
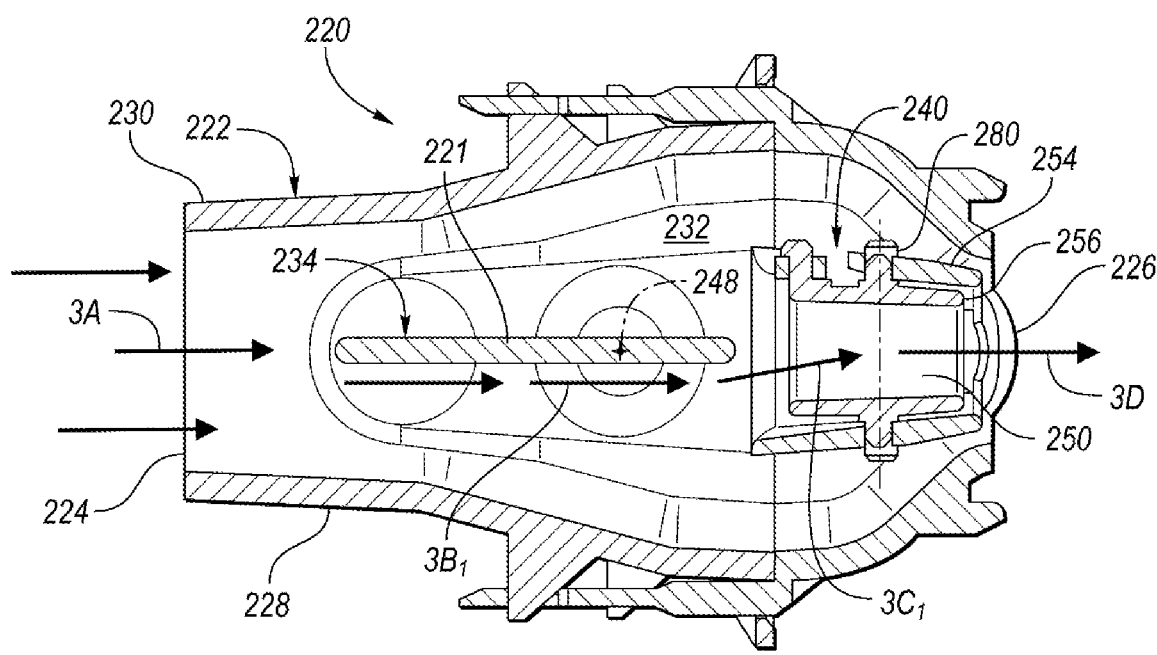
FIG. 4 is a cross-sectional enlarged view of another prior art vent outlet assembly in which the inlet and outlet guides are positioned in intermediate positions thereof.
Figure 5:
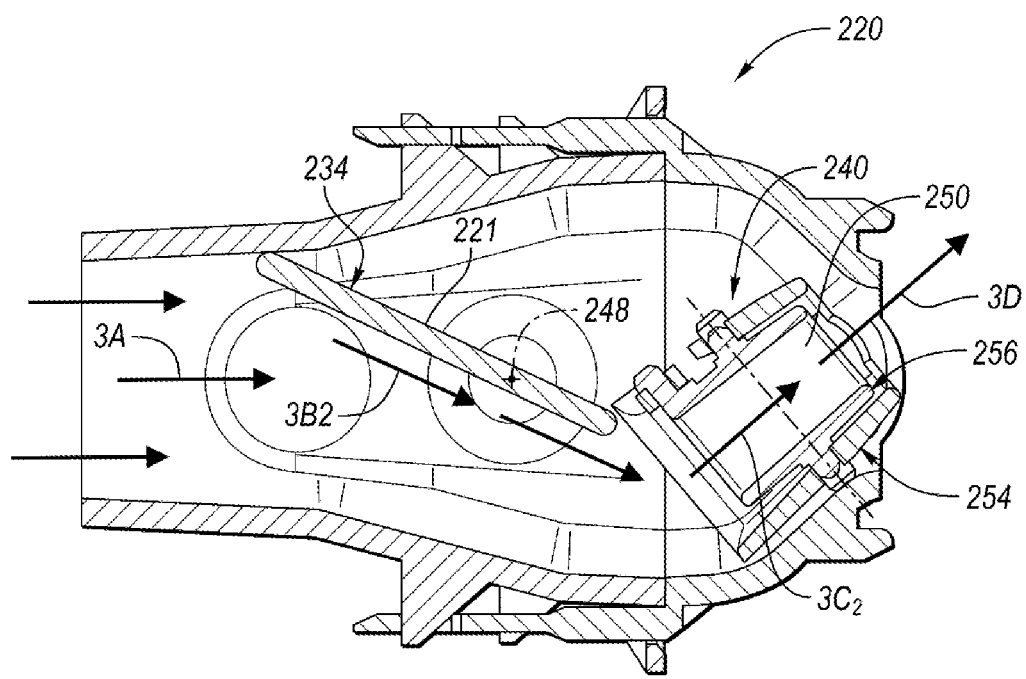
FIG. 5 is a cross-section of the vent outlet assembly of FIG. 4 in which the inlet and outlet guides are positioned in first inlet and outlet positions, respectively.
Figure 6:
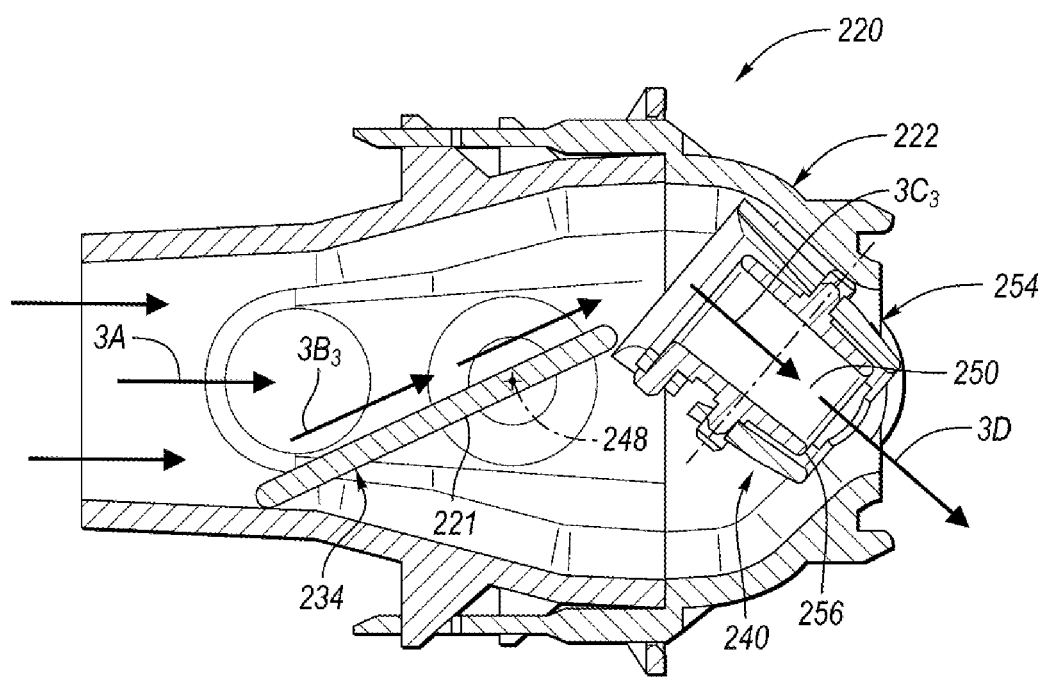
FIG. 6 is a cross-section of the vent outlet assembly of FIGS. 4 and 5 in which the inlet and outlet guides are positioned in second inlet and outlet positions, respectively.
Figure 7:
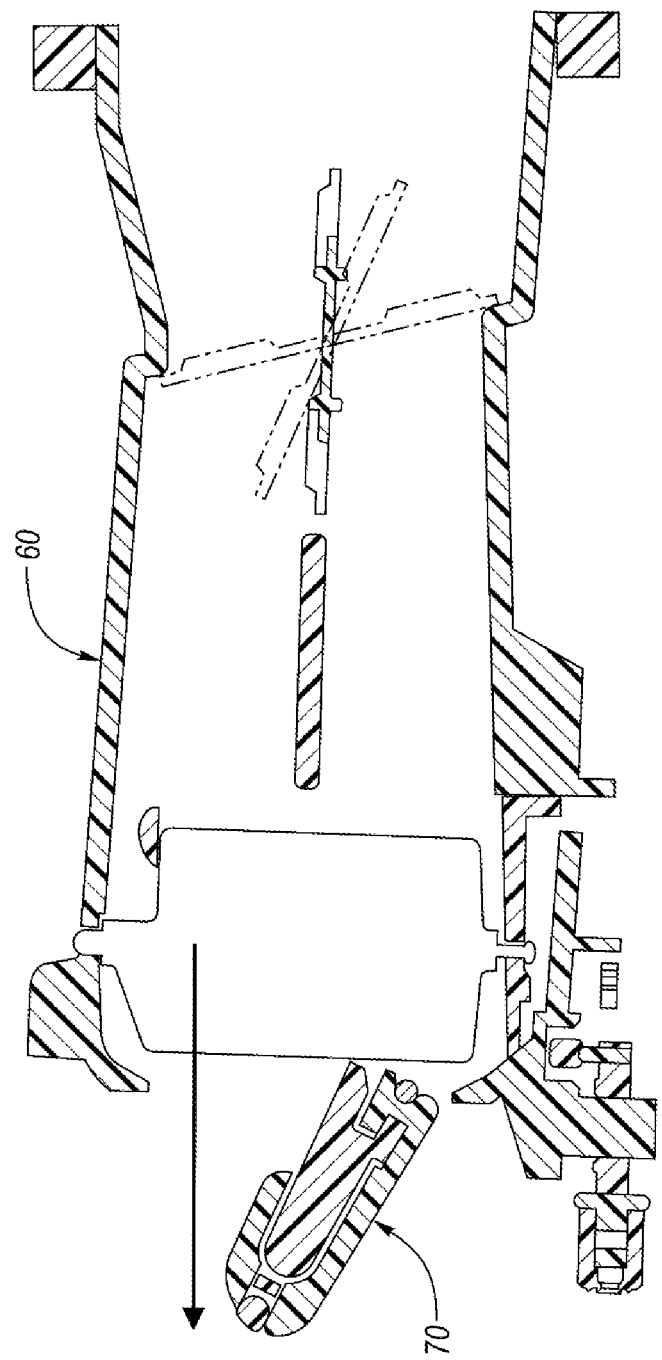
FIG. 7 is a side schematic view of prior art "slim" outlet register which exhibits a "blow-by" condition.
Figure 8:
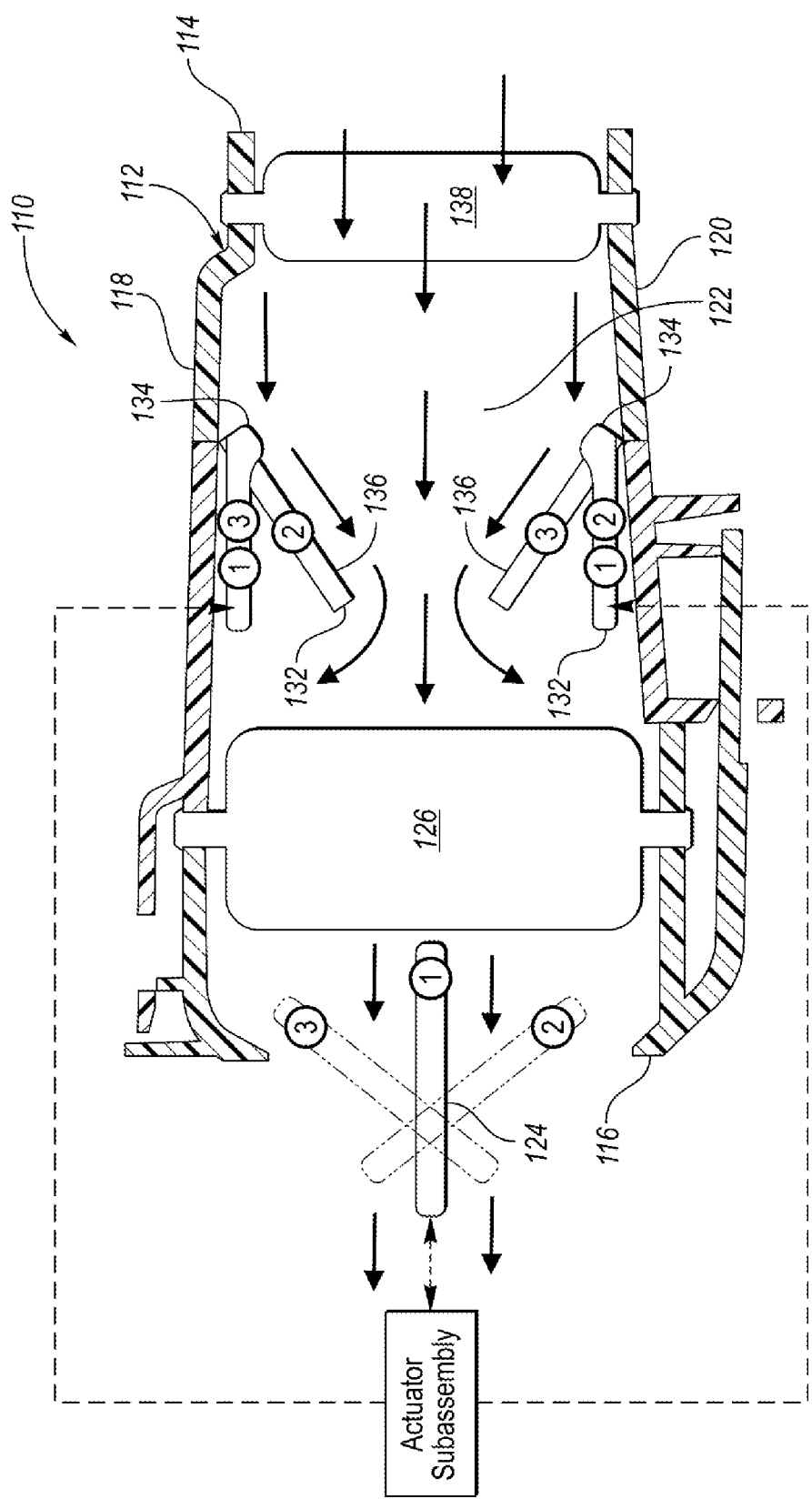
FIG. 8 is a side, schematic view, partially broken away and in cross-section, of an outlet assembly constructed in accordance with at least one embodiment of the present invention.

Referring now to FIG. 8, there is illustrated an outlet assembly, generally indicated at 110, for improving air flow in an air distribution system. The assembly 110 includes a housing, generally indicated at 112, having an inlet end 114 to receive the air flow and an outlet end 116 to discharge the air flow into a passenger cabin of a vehicle or into an enclosed space within a residential structure. The housing 112 includes upper and lower walls 118 and 120, respectively, which at least partially define a cavity 122 therebetween.

At least one control element (preferably a plurality of control elements such as a primary vane 124 and vertical vanes 126) is provided adjacent the outlet end 116 within the cavity 122 to control the flow of air discharged from the outlet end 116 and into the passenger cabin or enclosed space.

Upper and lower blocking elements, generally indicated at 128 and 130, respectively, each includes a nose 132, a tail 134, and a main body 136 between the nose 132 and the tail 134. Each blocking element 128 or 130 is movable to a blocking position between the upper and lower walls 118 and 120, respectively, to prevent a layer of air from flowing immediately adjacent its respective wall 118 or 120, and to direct that layer of air to flow around its nose 132.

The assembly 110 includes an actuator subassembly (which includes the primary vane 124) to move the upper blocking element 128 to direct the discharged air in an upward direction as indicated by the position "2" of the primary vane 124 and the upper blocking element 128.

In like fashion, the actuator subassembly including the primary vane 124 moves the lower blocking element 130 to direct the discharged air in a downward position as indicated by the position "3" of the primary vane 124 and the lower blocking element 130.

In other words, the upper and lower blocking elements, 128 and 130, respectively, are actuated in conjunction or in coordination with the primary vane 124. Position "1" as illustrated in FIG. 8 is a nominal position. Position "2" is a maximum upward position. Position "3" is a maximum downward position. Also, variable positions in between the different positions can also be achieved.

Figure 9:
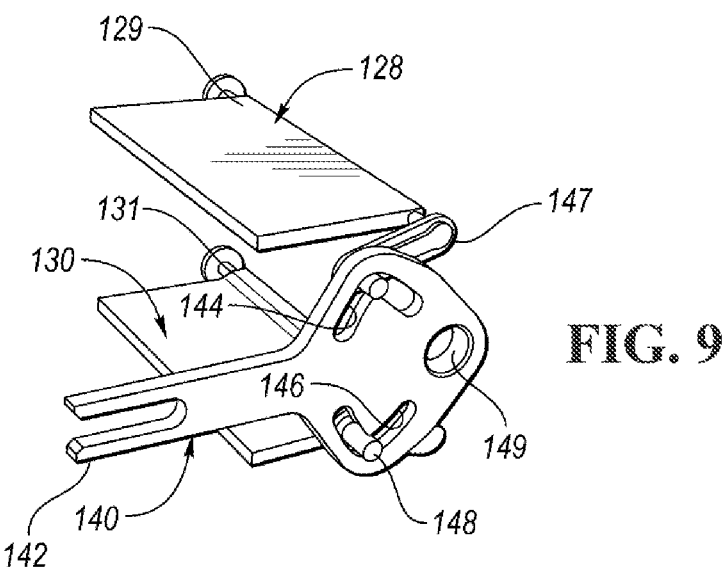
FIG. 9 is a side, schematic, perspective view of a first embodiment of a mechanism or subassembly for guiding and blocking air prior to the air hitting one or more primary vanes to avoid the "blow-by" condition.
Figure 10:
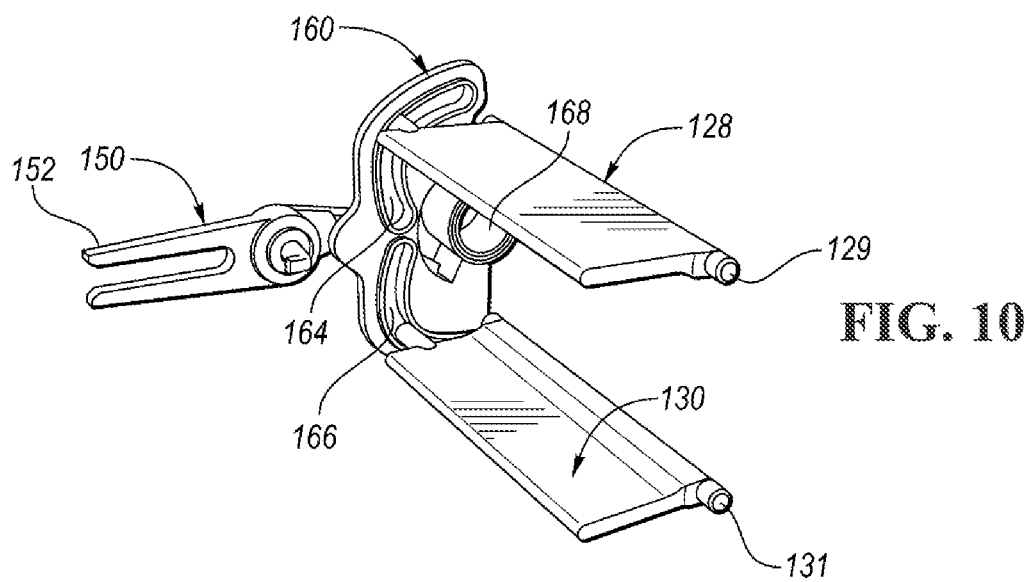
FIG. 10 is a side, schematic, perspective view of a second embodiment of the mechanism or subassembly to avoid the "blow-by" condition.
Figure 11:
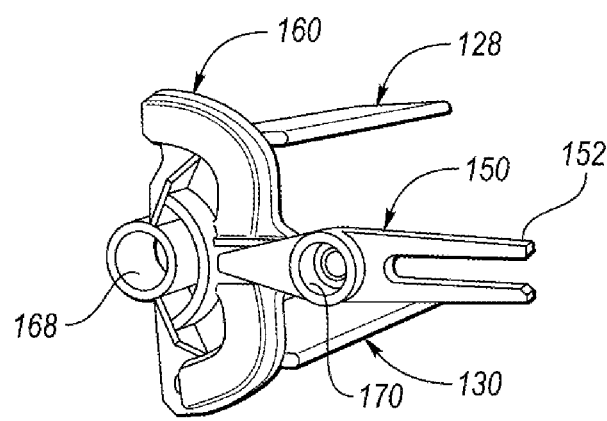
FIG. 11 is a back-side view of the mechanism or subassembly of FIG. 10.

Each of the blocking elements 128 and 130 preferably comprises a substantially flat vane pivotally connected to its respective wall 118 or 120 at its tail end 134 as best shown in FIGS. 9-11.

The assembly 110 also preferably includes a cellular air straightener 138 provided adjacent the inlet end 114 within the cavity 122 to straighten the received air flow. The air straightener 138 may have a honeycomb-like structure or any other shape to help straighten the inflow of air prior to encountering all of the vanes 124, 126, 128 and 130.

In summary, the outlet assembly 110 has a plurality of different operating modes for improving air flow in an air distribution system such as can be found in vehicles and residential structures. The assembly 110 includes the housing 112 having the inlet end 114 to receive the air flow and the outlet end 116 to discharge the air flow. The housing 112 includes first and second spaced apart walls 118 and 120, respectively, which at least partially define the cavity 122 therebetween.

The first blocking element 128 is supported by the first wall 118 for movement between blocking and unblocking positions within the cavity 122. The first blocking element 128 prevents a first layer of air from flowing immediately adjacent the first wall 118 in its blocking position.

The second blocking element 130 is supported by the second wall 120 for movement between blocking and unblocking positions within the cavity 122. The second blocking element 130 prevents a second layer of air from flowing immediately adjacent the second wall 120 in its blocking position.

The actuator subassembly includes the selector member 124 which is supported for movement relative to the housing 112 between a plurality of predefined positions which correspond to the different operating modes. The modes include first and second blocking modes and a nominal unblocking mode. The first blocking element 128 is actuated by the actuator subassembly to move to its blocking position in the first blocking mode. The second blocking element 130 is actuated by the actuator subassembly to move to its blocking position in the second blocking mode. The first and second blocking elements 128 and 130 are actuated by the actuator subassembly to move to their unblocking positions in the nominal unblocking mode.

The selector member preferably comprises the substantially flat primary vane 124 supported by the housing 112 for bi-lateral shifting movement to control the flow of air discharged from the outlet end 116.

The outlet assembly preferably has a relatively high aspect ratio wherein the housing 112 is substantially wider than it is tall.

The primary vane 124 and the first blocking element 128 are preferably configured to direct the discharged air in an upward direction in the first blocking mode.

The first blocking element 128 preferably comprises the substantially flat first vane 128 pivotally connected to the first wall 118 at one end of the first vane 128.

The primary vane 124 and the second blocking element 130 are configured to direct the discharged air in a downward direction in the second blocking mode.

The second blocking element 130 preferably comprises the substantially flat second vane 130 pivotally connected to the second wall 120 at one end of the second vane 130.

Each of the blocking elements 128 and 130 preferably comprises a substantially flat vane wherein the vanes 128, 124 and 130 are substantially parallel in the nominal unblocking mode.

In the embodiment of FIG. 9, the actuator subassembly includes a single control link, generally indicated at 140, coupled to the selector member 124 at a forked end 142 and to each of the blocking elements 128 and 130 at upper and lower control tracks 144 and 146, respectively, via links 147 and their corresponding pins 148, respectively, which ride in the tracks 144 and 146. End portions 129 and 131 of the blocking elements 128 and 130, respectively, are pivotally connected to the housing 112. The control link 140 is pivotable about a boss (not shown) on the housing 112 via a link pivot 149. Only one of the blocking elements 128 or 130 is actuated at a time by the primary vane 124 because of the above noted connections.

In the embodiment of FIGS. 10 and 11, the actuator subassembly includes an idler link, generally indicated at 150, coupled to the selector member 124 at a forked end 152 and a cam, generally indicated at 160, coupled to each of the blocking elements 128 and 130 so that only one of the blocking elements 128 or 130 is actuated at a time. The cam 160 is pivotably connected to the link 150. The cam 160 includes upper and lower control tracks 164 and 166, respectively, in which end portions of the vanes 128 and 130 ride or travel. End portions 129 and 131 of the blocking elements 128 and 130, respectively, are pivotally connected to the housing 112. The cam 160 and the idler link 150 are actuated by the primary vane 124 and are pivotable about bosses (not shown) on the housing 112 via pivots 168 and 170, respectively.

Figure 12:
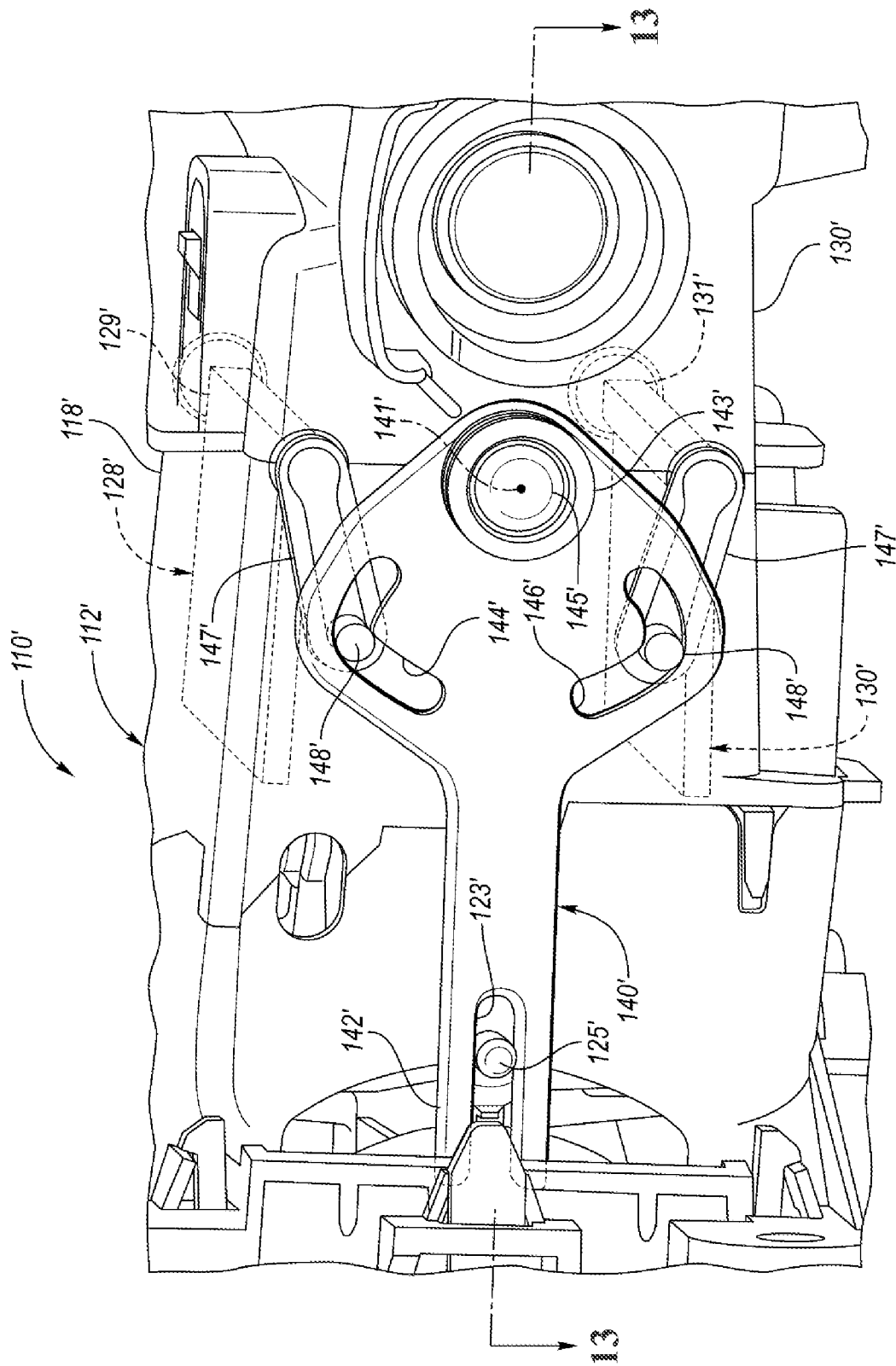
FIG. 12 is a side view, partially broken away, of an actuator arm of an actuator assembly constructed in accordance with at least one embodiment of the present invention wherein the actuator arm is in a neutral, non-blocking position.

FIG. 12 is a side view, partially broken away, of an actuator arm, generally indicated at 140', of an actuator assembly constructed in accordance with at least one embodiment of the present invention wherein the actuator arm 140' is in its neutral, non-blocking position. Parts shown in the embodiment of FIGS. 12-15 which are the same or similar in either structure or function to the parts of FIGS. 8 and 9 have the same reference number but a single prime designation.

The control link or actuator arm 140' is operatively connected to a pin 125' of a selector member 124' via a groove 123' at a forked end 142' thereof. Vertical vanes 126' are also illustrated in a cavity 122' defined by upper and lower walls 118' and 120', respectively, of the housing 112'. The actuator arm 140' is also operatively connected to each air blocking element 128' or 130' (i.e. vanes) at upper and lower control tracks 144' or 146', respectively, via links 147' and their corresponding pins 148' which ride in the kidney-shaped tracks 144' and 146'. End portions 129' and 131' of the air blocking elements 128' or 130', respectively, are pivotally connected to a housing 112'. The actuator arm 140' is also pivotally connected to a housing 112' for rotation about an arm axis 141' via a bushing 143', a screw 145' and an O-ring 149' (i.e. FIG. 13). As in a first embodiment, only one of the air blocking elements 128' or 130' is actuated at a time by the primary vane or selector member 124' because of the above-noted operative connections.

Figure 13:
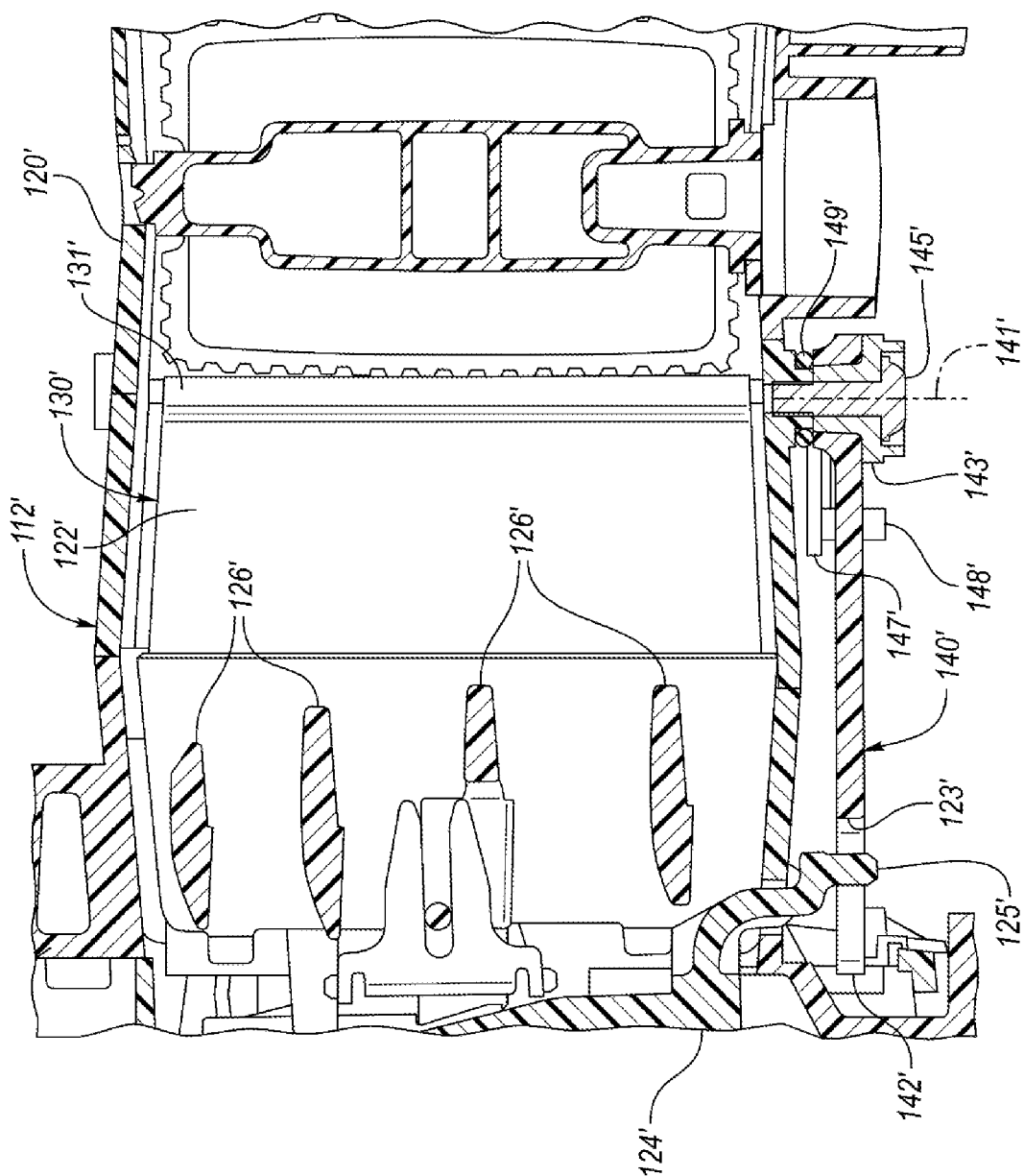
FIG. 13 is a sectional view, partially broken away, of the actuator assembly taken along lines 13-13 in FIG. 12.

FIG. 13 is a sectional view, partially broken away, of the actuator assembly taken along lines 13-13 in FIG. 12. Vertical vanes 126' are also illustrated in a cavity 122' defined by upper and lower walls 118' and 120', respectively, of the housing 112'.

Figure 14:
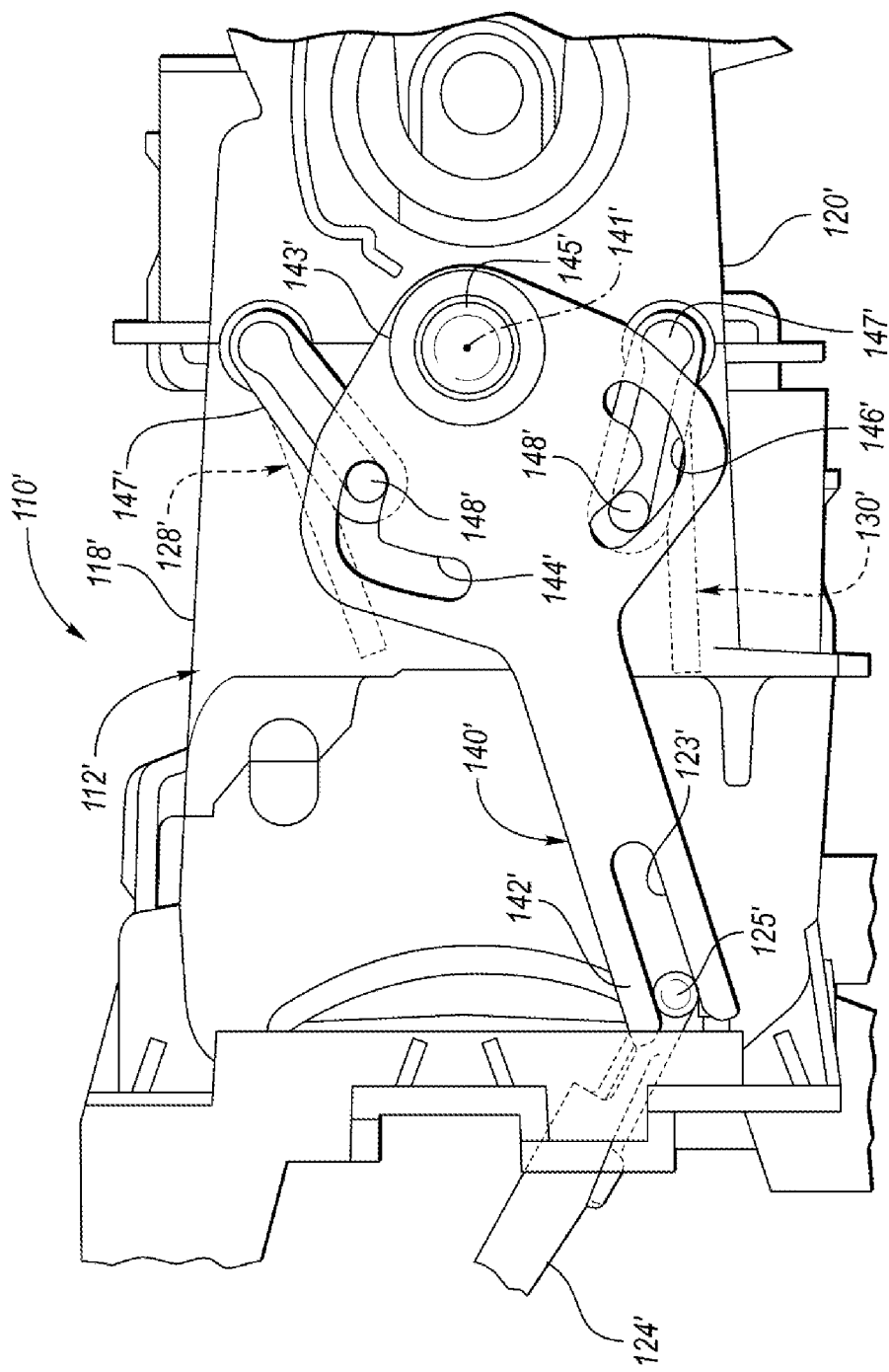
FIG. 14 is a view similar to the view of FIG. 12, but with the upper and lower air blocking elements illustrated in phantom, the upper air blocking element in its air blocking position and the selector member is directing the flow of discharged air upward.

FIG. 14 is a view similar to the view of FIG. 12, with the upper and lower air blocking elements 128' and 130' again illustrated in phantom. The upper air blocking element 128' is in its air blocking position and the selector member 124' is directing the flow of discharged air upward.

Figure 15:
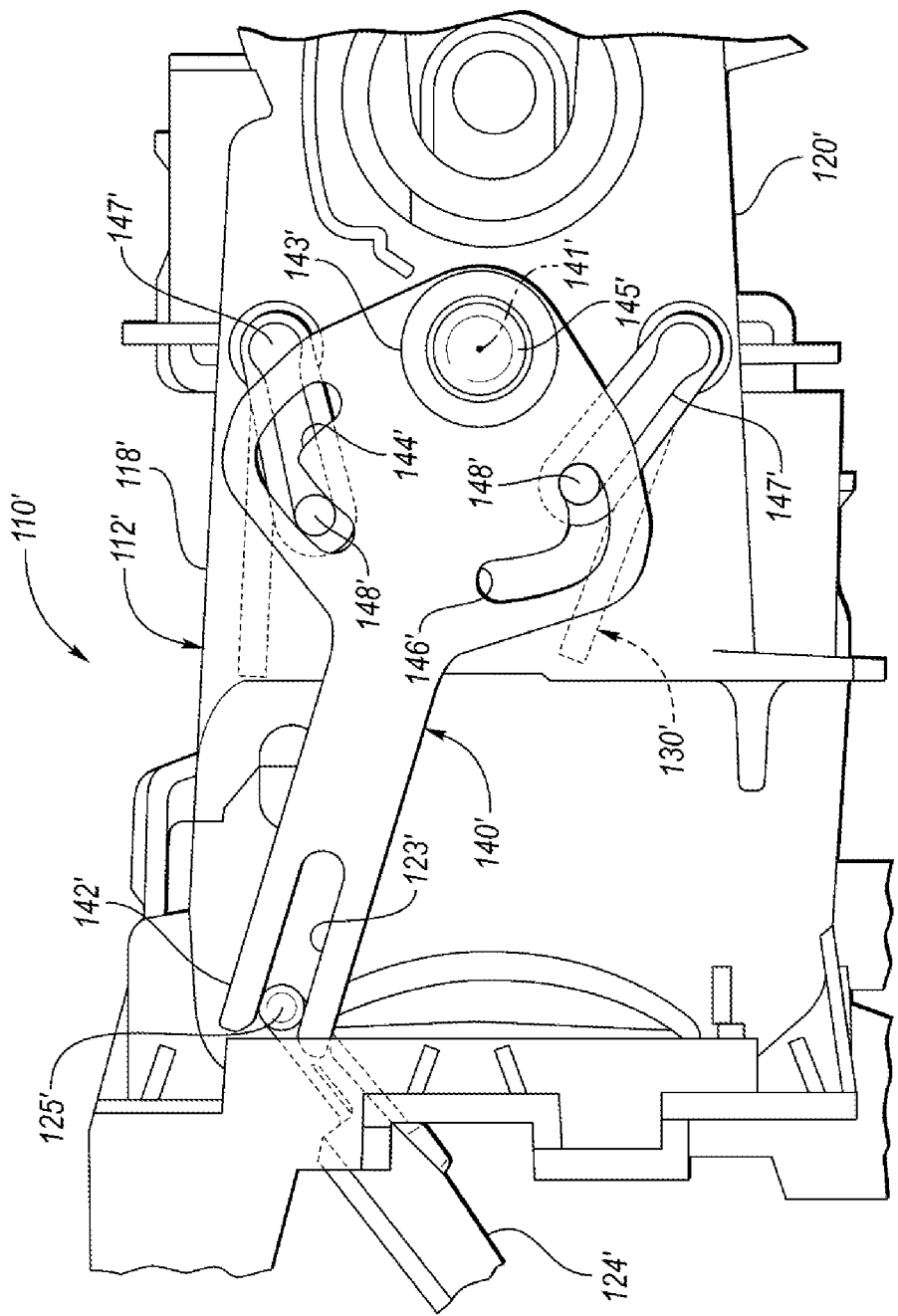
FIG. 15 is a view similar to the view of FIG. 14 with the lower air blocking element in its air blocking position and the selector member is directing the flow of discharged air downward.

FIG. 15 is a view similar to the view of FIG. 14 with the lower air blocking element 130' in its air blocking position and the selector member 124' directing the flow of discharged air downward.

In summary, an actuator assembly for actuating air blocking elements 128' and 130' of the outlet assembly 110' is provided. The actuator assembly includes the actuator arm 140' and the selector member 124' operatively connected to the actuator arm 140' to rotate the actuator arm 140' about the arm axis 141'. The actuator arm 140' is operatively connected to the first blocking element 128' to rotate the first air blocking element 128' towards its air blocking position (FIG. 14) without moving the second air blocking element 130' upon rotation of the actuator arm 140' in a first direction from a neutral, non-blocking position (FIG. 12) of the actuator arm 140' about the arm axis 141'. The actuator arm 140' is also operatively connected to the second blocking element 130' to rotate the second blocking element 130' towards its air blocking position (FIG. 15) without moving the first blocking element 128' upon rotation of the actuator arm 140' in a second direction opposite the first direction from the neutral, non-blocking position (FIG. 12).

The actuator arm 140' typically includes first and second control tracks 144' and 146,' respectively to receive and retain corresponding pins 148' of links 147' to the first and second blocking elements, 128' and 130', respectively, which ride in the control tracks 144' and 146' during rotation of the actuator arm 140'.

Each of the control tracks 144' and 146' is typically kidney-shaped.

The actuator arm 140' includes the groove 123' to receive and retain the pin 125' of the selector member 124' which rides in the groove 123' during rotation of the actuator arm 140'.

The air blocking elements 128' and 130' typically comprise upper and lower vanes.

The selector member 124' typically comprises a primary vane.

The outlet assembly 110' may be a vehicle outlet assembly or a residential outlet assembly.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An actuator assembly for actuating first and second air blocking elements of an outlet assembly, the actuator assembly comprising:
   an actuator arm; and
   a selector member operatively connected to the actuator arm to rotate the actuator arm about an arm axis;
   the actuator arm being operatively connected to the first air blocking element to rotate the first air blocking element towards its air blocking position without moving the second air blocking element out of its unblocking position upon rotation of the actuator arm in a first direction from a neutral, non-blocking position of the actuator arm about the arm axis, the actuator arm being operatively connected to the second air blocking element to rotate the second air blocking element towards its air blocking position without moving the first air blocking element out of its unblocking position upon rotation of the actuator arm in a second direction opposite the first direction from the neutral, non-blocking position, the actuator arm including first and second control tracks to receive and retain corresponding pins of links to the first and second air blocking elements, respectively, which ride in the control tracks during rotation of the actuator arm, wherein only one of the blocking elements is actuated at a time to reduce or eliminate blow-by condition.

2. The actuator assembly as claimed in claim 1, wherein each of the control tracks has an elongate shape with a turn in a middle portion thereof and with rounded edges.

3. The actuator assembly as claimed in claim 1, wherein the actuator arm includes a groove to receive and retain a pin of the selector member which rides in the groove during rotation of the actuator arm.

4. The actuator assembly as claimed in claim 1, wherein the first and second air blocking elements comprise upper and lower vanes, respectively.

5. The actuator assembly as claimed in claim 1, wherein the selector member comprises a primary vane.

6. The actuator assembly as claimed in claim 1, wherein the outlet assembly is a vehicle outlet assembly.

7. The actuator assembly as claimed in claim 1, wherein the outlet assembly is a residential outlet assembly.

8. The actuator assembly as claimed in claim 1, wherein the actuator arm extends between an air outlet end of the outlet assembly to be operatively connected to the selector member and an air inlet end of the outlet assembly to be operatively connected to the first and second air blocking elements.

9. The actuator assembly as claimed in claim 1, wherein the first and second air blocking elements are located at an air inlet end of the outlet assembly and the selector member is located at an air outlet end of the outlet assembly.

10. The actuator assembly as claimed in claim 9, wherein the first and second air blocking elements comprise upper and lower vanes, respectively, and the selector member comprises a primary vane.

11. The actuator assembly as claimed in claim 1, wherein:
    the selector member is pivotable between a tilted upward position and a tilted downward position;
    the actuator arm rotates in the first direction about the arm axis in response the selector member pivoting to its tilted upward position; and
    the actuator arm rotates in the second direction opposite the first direction in response to the selector member pivoting to its tilted downward position.

12. The actuator assembly as claimed in claim 1, wherein:
    the first and second air blocking elements comprise upper and lower vanes, respectively, located at an air inlet end of the outlet assembly;
    the selector member comprises a primary vane located at an air outlet end of the outlet assembly; and
    the primary vane is pivotable between a tilted upward position and a tilted downward position, the actuator arm rotates in the first direction about the arm axis in response to the primary vane pivoting to its tilted upward position, and the actuator arm rotates in the second direction opposite the first direction about the arm axis in response to the primary vane pivoting to its tilted downward position.

13. A manual actuator assembly for actuating first and second air blocking elements of an outlet assembly, the actuator assembly comprising:
    an actuator arm; and
    a manually operable selector member operatively connected to the actuator arm to rotate the actuator arm about an arm axis;
    the actuator arm being operatively connected to the first air blocking element to rotate the first air blocking element towards its air blocking position without moving the second air blocking element out of its unblocking position upon rotation of the actuator arm in a first direction from a neutral, non-blocking position of the actuator arm about the arm axis, the actuator arm being operatively connected to the second air blocking element to rotate the second air blocking element towards its blocking position without moving the first air blocking element out of its unblocking position upon rotation of the actuator arm in a second direction opposite the first direction from the neutral, non-blocking position, the actuator arm including first and second control tracks to receive and retain corresponding pins of links to the first and second air blocking elements, respectively, which ride in the control tracks during rotation of the actuator arm, wherein only one of the blocking elements is actuated at a time to reduce or eliminate blow-by condition.

14. The actuator assembly as claimed in claim 13, wherein each of the control tracks has an elongate shape with a turn in a middle portion thereof and with rounded edges.

15. The actuator assembly as claimed in claim 13, wherein the actuator arm includes a groove to receive and retain a pin of the selector member which rides in the groove during rotation of the actuator arm.

16. The actuator assembly as claimed in claim 13, wherein the first and second air blocking elements comprise upper and lower vanes, respectively.

17. The actuator assembly as claimed in claim 13, wherein the selector member comprises a primary vane.

18. The actuator assembly as claimed in claim 13, wherein the outlet assembly is either a vehicle outlet assembly or a residential outlet assembly.

19. An actuator assembly for use with an outlet assembly having an air outlet end, an air inlet end, an upper vane adjacent the air inlet end and being rotatable between an unblocking position and an air blocking position in which the upper vane is tilted downward, and a lower vane adjacent the air inlet end and being rotatable between an unblocking position and an air blocking position in which the lower vane is tilted upward, the actuator assembly comprising:

an actuator arm;

a primary vane at the air outlet end, the primary vane being pivotable between a tilted upward position and a tilted downward position, the primary vane being operatively connected to the actuator arm to rotate the actuator arm about an arm axis in a first direction when the primary vane pivots to its tilted upward position and a second direction opposite the first direction when the primary vane pivots to its tilted downward position; and the actuator arm being operatively connected to the upper vane to rotate the upper vane towards its air blocking position without moving the lower vane out of its unblocking position upon rotation of the actuator arm in the first direction from a neutral, non-blocking position of the actuator arm about the arm axis, the actuator arm being operatively connected to the lower vane to rotate the lower vane towards its air blocking position without moving the upper vane out of its unblocking position upon rotation of the actuator arm in the second direction opposite the first direction from the neutral, non-blocking position, the actuator arm including first and second control tracks to receive and retain corresponding pins of links to the upper and lower vanes, respectively, which ride in the control tracks during rotation of the actuator arm, wherein only one of the upper vane and the lower vane is actuated at a time to reduce or eliminate blow-by condition.

* * * * *